United States Patent [19]

Simon

[11] Patent Number: 5,236,387
[45] Date of Patent: Aug. 17, 1993

[54] FOOD PROCESSING DEVICE

[76] Inventor: Robert Simon, 384 Parum Rd., Colchester, Conn. 06415

[21] Appl. No.: 758,010

[22] Filed: Sep. 12, 1991

[51] Int. Cl.⁵ .............................................. A22C 25/06
[52] U.S. Cl. .................................................... 452/194
[58] Field of Search ....................... 452/194, 195, 196; 269/289 R

[56] References Cited

U.S. PATENT DOCUMENTS 4,682,803  7/1987  Andrews ............................ 452/196
4,977,644  12/1990  Evans et al. ......................... 452/195

FOREIGN PATENT DOCUMENTS 404752  1/1934  United Kingdom ............ 269/289 R

Primary Examiner—Willis Little
Attorney, Agent, or Firm—C. G. Nessler

[57] ABSTRACT

A mat for holding, e.g., fish for filleting, is comprised of a grid of intersecting ribs having small oblong projections, contained within a supporting frame. The ribs are spaced apart to form relatively large open squares, and the sharp edged projections are centered on the ribs to form pocket like regions at the rib intersections, all to particularly well hold an object such as a fish.

13 Claims, 1 Drawing Sheet

FOOD PROCESSING DEVICE

TECHNICAL FIELD

The present invention relates to devices for food processing, more particularly to a device for holding fish and other animal product while filleting or otherwise preparing them.

BACKGROUND OF THE INVENTION

The present invention is particularly suitable for preparing and filleting fish and like cold blooded aquatic creatures. As is well known such creatures tend to be curved in exterior shape, and smooth and slippery on their outer surfaces. They are thus hard to grip and tend to slide about when processed to de-scale, clean, or fillet to remove skeletal bones. Not only is accomplishment of the task slowed, but there is risk to a person of cutting oneself.

In fact, special products have been created heretofore to aid the fisherman or cook in such endeavors. Price et al. U.S. Pat. No. 3,908,231 describes a cutting board with a clamp which holds the tail of a fish. U.S. Pat. No. 4,017,063 describes a similar cutting board having a grooved cutting surface. It is well known in general to put grooves or holes in cutting boards to channel blood and fluids to catchment places. See Design U.S. Pat. No. 230,553 to Terlizzi. Grooves and depressions in the surface of pastry boards, to prevent dough from slipping during rolling are known. See UK Pat. No. 188 (1905). And of course plastic mats with various surface patterns, and with open grid patterns, are well known for utility use in kitchens and the like; however, they are not particularly adapted to holding food product from slipping while it is being worked on.

Generally speaking, the commercially available products for fish filleting today tend to comprise coarse gloves which frictionally engage the fish, along with cutting boards having simple grooves and tail clamps. Such cutting boards have been inconvenient and insufficient to the task.

Thus there is a need for a device which has improved capability of holding the food product. At the same time such useful device has to be adapted to ready cleaning, and reasonably low in cost of manufacture.

DISCLOSURE OF THE INVENTION

An object of the invention is to enable processing of difficult to hold food product, such as fish bodies, with a simple and economical device which is easily cleaned.

In accordance with the invention, a device is comprised of a grid of intersecting ribs which have relatively sharp cornered spaced apart projections extending upwardly on the side adapted to receive the food product. When the food product rests on the device it is thus held by the combination of rib pattern and projections.

In a preferred embodiment, the device is a flexible plastic mat having an open grid of squares formed by mutually perpendicular rib arrays, and the projections are single oblongs located at the rib midpoints. The projection pattern thus forms pocket like regions in the vicinity of the intersections to better hold the food product. The grid of ribs is contained within a circumscribing frame of rails which gives supporting structure to the rib array.

The invention is readily made by plastic injection molding and is adapted to be used in a variety of situations, both out in the sporting field and in the home kitchen. It is readily cleaned and supportive of good health practice.

The foregoing and other objects, features and advantages of the invention will become more apparent from the following description of the best mode of the invention and accompanying drawings.

BEST MODE FOR CARRYING OUT THE INVENTION

Figure 1:
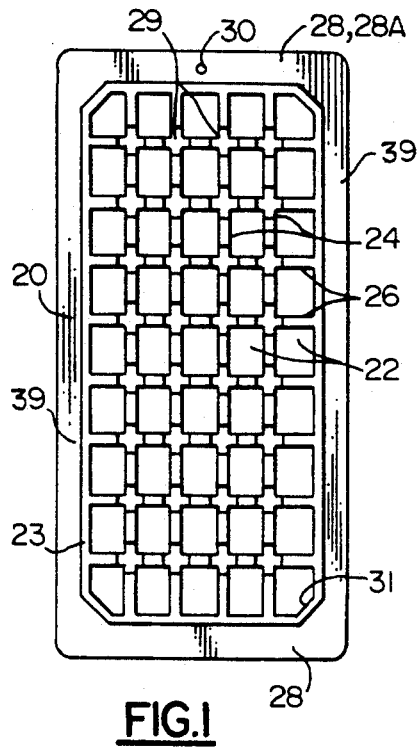
FIG. 1 is a planar view of a mat comprised of perpendicular ribs and a circumscribing frame.

The invention is described in terms of its use to fillet fish. FIG. 1 shows, looking down on its top, a preferred embodiment mat. The mat 20 has circumscribing lengthwise rails 28 and widthwise rails 39 which form an open frame 20. Attached within the openness of the frame is a grid of lengthwise ribs 24 and perpendicular transverse ribs 26. The lengthwise and transverse ribs meet each other at intersections 29, to define an array of square open spaces 22. For esthetic and structural reasons, the rails are shaped so the interior corners 31 of the frame are angled. There is provision for hanging the mat by hole 30 in the end rail 28A.

Figure 2:
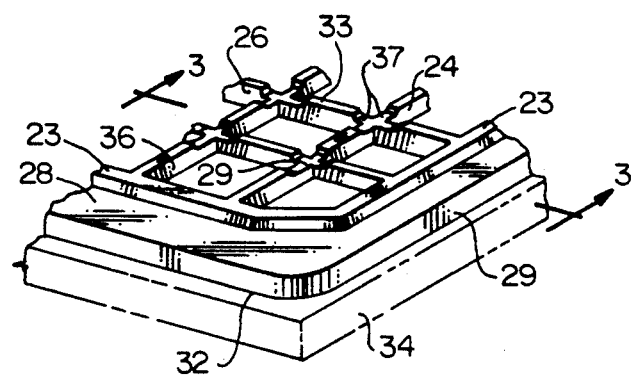
FIG. 2 shows a corner portion of a mat in more detail, showing the ribs with oblong projections.
Figure 3:
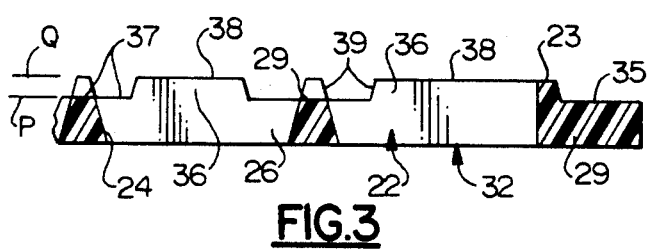
FIG. 3 is a cross section through the portion of FIG. 2 showing the open grid and the preferred projection configuration.

A corner portion of the mat of FIG. 1 is shown in FIG. 2, and a cross section of the corner part is shown in FIG. 3. An essentially planar bottom 32, comprised of the base surfaces of the frame and ribs, rests on a support surface 34, shown in phantom, such as more or less flat boat part or a food cutting board. The support surface may be smooth or it may have relatively small holes or channels for gathering the liquids which fall through the mat.

The frame 20 has an essentially smooth upper surface 35 lying in plane P; the ribs 24, 26 have upper surfaces 37 which also lie nominally in the plane P. Mounted on the ribs are spaced apart oblong projections 36, the tops 38 of which lie in the plane Q which is elevated above the level of plane P. The projections thus provide an interrupted upper surface to the mat, to receive a fish or other food product and keep it from slipping about when it is being worked on. The frame has a circumscribing ridge 23 of the same height and function as the projection tops, and the adjacent projections 38 extend to it.

FIG. 3 shows that the projection tops 38 lying in plane Q have relatively sharp edges 39. Preferably the projections have edge radii as sharp as commercially feasible in molded plastic product, as small as 0.005–0.008 inch, and in the range of 0.010–0.030 inch.

Figure 4:
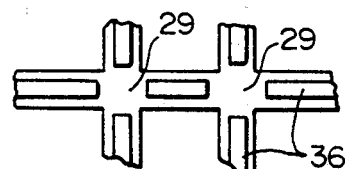
FIG. 4 is a more detail planar view showing projections at the midpoint of ribs and spaced apart from the intersections.

The more detailed FIG. 4 top view of the mat, along with FIGS. 2 and 3, shows that each oblong projection is positioned on the rib at a point intermediate the intersections 29 with other ribs. Thus, as illustrated especially by FIG. 3 and 4, the absence of projections at the rib intersection point creates a pocket like region which aids in the holding action.

The rib pattern and specially shaped and located projections in combination serve to hold a fish in place. The simplicity of the combination, combined with the open grid structure, makes cleaning of the mat especially convenient.

The spacing of the ribs is important in that if they are too close, there will be too much support, i.e., the body of the fish will not curve into the spaces between the ribs and the gripping action of the well-defined edges will not be accomplished. On the other hand, if the ribs are too far apart there will be be an insufficient number of projections frictionally engaged with the fish body and it will tend to slide about. While the character of fish or other food product will vary, for general fish applications, the square pattern of ribs should provide spaces having nominal ¾ to 1¼ inch openings, most preferably one inch.

The oblong projections described above have a length along the rib which is greater than the nominal top width; the nominal aspect ratio is 12:1. Preferably, for simplicity and ease of cleaning, etc., a single oblong projection is centrally positioned on the rib centrally between intersections. The oblong projection length is preferably is about ⅔ of the rib length between intersections.

The oblong projections are tapered and are relatively narrow in width as shown in FIG. 3. Preferably, the angle from the vertical of a projection (and rib) side is 10-30 degrees, most preferably about 18 degrees. Preferably, the projection top is 0.040-0.100 inch in width, most preferably about 0.060 inch.

In a preferred embodiment of the invention, the frame has a length of about 17 inch, a width of about 9 inch, and a thickness of about ⅛ inch. The rib open grid pattern is square and the ribs are spaced apart on 1⅛ inch centers. The ribs and projections mounted thereon are tapered in cross section, with sidewall angles of about 18.5 degrees from the vertical. The ribs are about 3/16 wide at the base surface and about 9/64 wide at the top surface (in plane P); they are about ⅛ high. The projections extend about 1/16 inch above the plane P of the top of the ribs; they are about 1/16 wide at the top surface (in plane Q) and about 9/64 wide at the base; The projections, centered between the intersections of the ribs, are about ¾ inch long at the uppermost surface.

In use, the mat is placed on a support surface. A fish is laid on the top surface of the mat. It is manually pressed downwardly against the mat, to cause the fish to deflect into the spaces between the projections—both at intersections and at the grid openings—to cause the projections to frictionally engage the fish. The mat is by the same force frictionally engaged with the support surface. The fish may then be filleted and otherwise worked. In filleting of a fish, there is typically a thrust parallel to the support surface, and it is in resisting this force that the mat is particularly useful.

Figure 5:
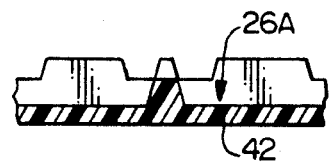
FIG. 5 is a cross section of a mat like that of FIG. 3 but shows a grid which has a closed grid.

Alternative embodiments are within the scope of the invention. As shown in FIG. 5, the mat may be configured so that there is a continuous bottom surface 42, so that spaces 26A are closed off, thus providing increased structural integrity to the ribs and retention of any debris of the animal processing. This embodiment is less preferred because it is somewhat more difficult to clean.

Figure 6:
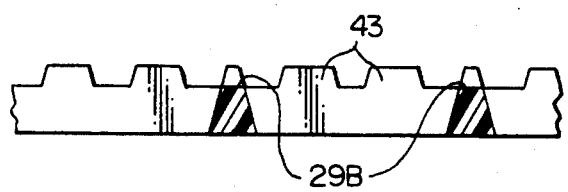
FIG. 6 shows multiple projections between the intersections of ribs.

FIG. 6 illustrates an alternative in which two smaller oblong projections 43, are present between the rib intersections 29B. More than two projections may be used, even to the point where they are no longer oblong in the sense described above. While the projections are most preferably located intermediate the intersections as described above, in the generalization of the invention, they may be less preferably positioned at the intersections as well, so that the spaces between projections lie at other than the intersections.

The frame need not be rectangular, although such shape is most conventional. The frame can be oblong, round, etc. Furthermore, while it is preferable from an esthetic and durability standpoint, the frame can be omitted entirely in the essential invention.

Figure 7:
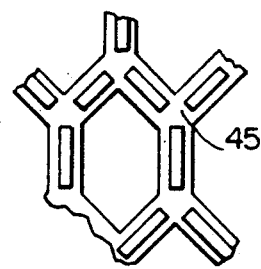
FIG. 7 shows a rib pattern with triangular intersections and more complex polygon grid openings.

Preferably, the grid pattern is rectilinear or square as is the one shown in FIG. 1. Other grid patterns may be employed in the practice of the invention, including the angled one of FIG. 7, where three ribs intersect at nodes 45. Curved or rounded patterns, or even more complex shapes for decorative purposes, may also be employed.

The mat is preferably made from a polymer material which has strength with a certain flexibility, cut-resistance, and chemical stability. For on-boat applications, a bouyant material is preferred. The mat is desirably compliant to lie evenly on somewhat contoured surfaces such as are found on boats. On the other hand, a certain rigidity is desired to enable the projections to carry our their gripping function. These competing aims dictate a compromise when the mat is made of a unitary material (as opposed to a composite or bi-material) for economic reasons. Thus, polypropylene or high density polyethylene are preferred materials. Other known plastic resins and elastomers used for marine, household and kitchen devices may be utilized. In addition, the mat can be made of wood or metal, although such are only preferred when there is no need for mat compliance to a gently contoured surface.

For simplicity of manufacture and cleaning, the mat has a smooth base surface. The mat will typically engage the support surface with sufficient friction to enable carrying out of the invention purposes. However, projections, suction cups, clamps, adhesives, etc., may be added to the base surface to increase the adherance or friction with the support surface.

The invention is described in terms of a thin lightweight plastic mat which can be conveniently stored and used on a fishing boat or in a kitchen. However, within the scope of the concept of the invention is that the mat described above may be incorporated permanently to a substructure such as a wood table, a plastic catch basin etc. In such case the essentially flat lower surface described above for the mat would be present as a plane within the total structure. The invention also has been described in terms of the processing of a fish, but it also is well adapted to cutting or processing of other hard to grip and rounded food products, such as birds, rabbits, game, etc.

Although only the preferred embodiment has been described with some alternatives, it will be understood that further changes in form and detail may be made without departing from the spirit and scope of the claimed invention.

I claim:

1. A flexible mat for holding food product from sliding during processing thereof, comprising a) rails forming an open frame having a top surface, and a base surface for mounting the frame;

b) a plurality of ribs running within the open frame and attached to the rails, to form an open grid, the ribs meeting at intersections, the bottom surfaces of the ribs forming a mounting surface plane along with the base surface of the frame, and the top surfaces of the ribs lying in a plane P; and c) narrow oblong projections having sharp corners, mounted on the ribs and extending to an elevation higher than plane P, the projections spaced apart from the rib intersections to form pocket like regions at the rib intersection, to grip food product laid on the mat.

2. The device of claim 1 further comprising projections which are spaced apart from the intersections of the ribs.

3. The device of claim 2 further comprising ribs having single oblong projections positioned at points intermediate the rib intersections.

4. The device of claim 1 further, comprising an open grid, wherein open spaces between the ribs enable food debris to fall through the grid to a surface support.

5. The device of claim 1 further comprising ribs oriented perpendicularly to each other to define a grid pattern of square spaces between the ribs.

6. The device of claim 1 further comprising a frame circumscribing the grid.

7. The device of claim 6 further comprising square spaces of about ¾ to 1¼ inch side dimension.

8. The device of claim 6 further comprising a ridge circumscribing the interior edge of the frame where the ribs are attached.

9. The device of claim 1 comprising oblong projections having tapered cross section and greater width where they attach to the ribs.

10. The device of claim 1 further comprising ribs which are tapered in cross section and narrower at the grid top side.

11. The device of claim 1 wherein the mat is made of a compliant polymer.

12. The device of claim 1 characterized in by oblong projections having a length of about 65 percent of the length of the rib between the intersections and aspect ratios of about 12:1.

13. A device for working food product comprising a grid of intersecting ribs, having a grid bottom for mounting the mat on a support surface and a grid top for receiving food product;

the grid being closed by a membrane across the grid bottom, to prevent food debris from falling through the device to the support surface; and, spaced apart sharp cornered projections extending from a plurality of the ribs at the grid top, for resisting movement of the food product.

* * * * *